United States Patent [19]
Tupper

[11] Patent Number: 6,133,669
[45] Date of Patent: *Oct. 17, 2000

[54] LOW-LOSS MAGNET CORE FOR HIGH FREQUENCY CLAW-POLE-TYPE ALTERNATOR

[76] Inventor: Christopher N. Tupper, R.F.D.#5, Box 2539, Cundy's Harbor Rd., Brunswick, Me. 04011

[ * ] Notice: This patent issued on a continued prosecution application filed under 37 CFR 1.53(d), and is subject to the twenty year patent term provisions of 35 U.S.C. 154(a)(2).

[21] Appl. No.: 09/002,299

[22] Filed: Dec. 31, 1997

[51] Int. Cl.[7] .................................................. H02K 19/22
[52] U.S. Cl. .......................................... 310/263; 310/217
[58] Field of Search .................................... 310/263, 216, 310/218, 217, 257, 261, 112, 269, 114

[56] References Cited

U.S. PATENT DOCUMENTS

| | | | |
|---|---|---|---|
| 1,450,521 | 4/1923 | Steinbach | 310/263 |
| 2,196,682 | 4/1940 | Nowosielski | 310/263 |
| 2,243,318 | 3/1941 | Rawlings | 310/263 |
| 3,944,863 | 3/1976 | Apsit et al. | 310/168 |
| 5,122,705 | 6/1992 | Kusase et al. | 310/68 D |

FOREIGN PATENT DOCUMENTS

| | | | |
|---|---|---|---|
| 469476 | 4/1914 | France | 310/263 |
| 235395 | 1/1911 | Germany | 310/263 |
| 235600 | 4/1923 | Germany | 310/263 |

OTHER PUBLICATIONS

Tupper, Christopher N., "Demonstration of the Production of 60 HZ AC Power Directly From High Frequency Alternators," Ding./TR–95–01, Oct. 1995.

*Primary Examiner*—Nestor Ramirez
*Assistant Examiner*—Karl Imayoshi Tamai
*Attorney, Agent, or Firm*—Pierce Atwood; Chris A. Caseiro

[57] ABSTRACT

A low-loss magnetic core of the claw-pole type for use in generating electrical power with a high frequency alternator is disclosed. A rotor, driven by a shaft, is made of pairs of individual poles of alternating polarity nested radially around a shaft. The rotor poles overlap each other axially and interleave circumferentially. The rotor poles are excited by a common field coil. The pairs of individual poles are made from laminated electrical steel or magnetic steel, with laminate shapes bent and bundled together to form an open three dimensional shape vaguely similar to one and one quarter turns of a spiral shape. A stator is made of ring bundles of laminated electrical steel or magnetic steel, with internal teeth. Various arrangements of windings on the stator teeth create armature poles for multiple phases of output voltage. The low loss magnetic core allows for efficient operation at high shaft speed and allows for efficient AC excitation of the rotor for special applications.

20 Claims, 6 Drawing Sheets

LOW-LOSS MAGNET CORE FOR HIGH FREQUENCY CLAW-POLE-TYPE ALTERNATOR

BACKGROUND OF THE INVENTION

1. Field Of the Invention

This invention relates generally to the design of the structure of the magnetic core for high frequency alternators used to generate electrical power, and more particularly to a low loss core of the claw pole type alternator.

2. Description of the Prior Art

The production of electrical power from high frequency alternators allows small units to generate high levels of power output due to the rapid change of flux. The small size and weight of high frequency units conveys numerous benefits in the design, manufacture and cost of power systems. Furthermore, the output of high frequency alternators, when coupled with solid state controls, can produce high quality DC and low frequency AC power relatively independent of the speed of the driving engine. This confers numerous other system benefits, including optimization of engine speed for minimum fuel consumption, or generation of power incidental to operation of a prime mover.

The claw pole alternator structure provides a large number of field poles of alternating polarity excited by a single rotor coil. The large number of poles and the alternating polarity of adjacent poles in the claw pole design combine to produce the high frequency change of flux needed for high frequency power production and small size.

Generally, laminated magnetic materials are used in the magnetic pathways where flux varies rapidly. This dramatically reduces the losses due to eddy currents caused by the varying flux. Magnetic and electrical steels are used to minimize the hysteresis losses caused by flux variation. Typically the laminated materials are used in the stator structure that surrounds the claw pole rotor because high frequency alternators are designed for the flux to fluctuate in the armature poles located on the stator. Because the claw pole rotor of a typical high frequency alternator is normally subjected to quasi-DC excitation, it is possible and convenient to manufacture the rotor from solid iron. Solid iron rotors are relatively simple to manufacture, and allow for automatic shifting of the flux distribution within the rotor during rotation.

However, for applications involving the modulated excitation of the field, such as detailed by Hilgendorf in U.S. Pat. No. 3,916,284, there are large core losses (eddy current losses and hysteresis losses) in the solid iron rotor. Furthermore, even for quasi-DC excitation, at high shaft RPM the shifting of flux under the armature poles causes very high core losses in the tips of the (solid) rotor claws. ("Slotting harmonics of the air-gap field induce eddy currents into the claws . . . . It was found that the ratio of iron losses (rotor to stator) is about 2:1"—Kuppers and Henneberger, "Numerical Procedures for the Calculation and Design of Automotive Alternators", *IEEE Transactions on Magnetics*, vol. 33, no. Mar. 2, 1997.) These losses grow with increasing frequency, and become a greater percentage of the overall losses as the frequency increases. Tests by Kuppers and Henneberger show that for a typical claw pole alternator operating at 10,000 shaft RPM the core losses in the solid iron core become a full third of the total losses. These losses are also the fastest growing portion of losses as the shaft speed increases further. These rotor core losses become a limiting factor in increasing the alternator frequency in order to reduce size and weight.

OBJECTS OF THE INVENTION

It is an object of the present invention to produce an alternator with a claw pole rotor with low loss magnetic pathways in order to reduce the core losses in the rotor. It is also an object of the present invention to create an alternator rotor and stator core structure including laminated magnetic materials arranged such that the magnetic pathways provide a complete magnetic circuit for magnetic flux flow without reliance on adjacent laminates. It is a further object of the present invention to produce an alternator claw pole rotor that can be subjected to AC excitation, or other modulated excitation, with minimal core losses.

Typically, there are three separate phases of output voltage created by armature coil windings spaced around the circumference of the stator in a claw pole type alternator. Any one stator tooth has the windings of one phase and the two adjacent teeth each have the windings of one of the other two phases. There are typically six stator teeth, two for each phase, spread over the circumference of the arc encompassed by an adjacent pair of rotor poles. This means that the rotor poles must rotate position by six stator teeth in order to complete a full alternation cycle for each phase. This arrangement becomes a limiting factor in increasing the alternator frequency in order to reduce size and weight of the generator. It is an additional object of the present invention to allow for the possibility of a pole structure that provides a high alternation frequency per shaft revolution, if desired.

SUMMARY OF THE INVENTION

The objects set forth above as well as further and other objects and advantages of the present invention are achieved by the embodiments of the invention described herein below. The present invention includes a stator including one or more stator ring bundles made entirely of laminated electrical or magnetic steel, or other suitable magnetic material with low core losses, in order to minimize eddy current losses and hysteresis losses in the stator. The stator is configured with internal teeth and air slots configured around the inner edges of the ring bundles. The invention also includes a claw pole rotor with multiple poles wherein adjacent poles alternate in polarity. The magnetic pathways of said rotor are constructed entirely of laminated electrical or magnetic steel, or other suitable magnetic material with low core losses in order to minimize eddy current losses and hysteresis losses in the rotor. A field coil magnetizes the rotor and excites the alternator. Armature coils are wound over one or more stator teeth to form armature poles. The rotor is turned by means of a shaft, and the arrangement of the magnetic pathways through the rotor poles and the stator teeth is designed so that rotation of the shaft causes flux variations in the stator teeth, generating voltage in the armature poles. The locations of the windings of the various armature poles on the stator and the series and parallel combinations of the electrical connections of these armature windings are arranged to provide one or more phases of output voltage.

For a better understanding of the present invention, together with other and further objects thereof, reference is made to the accompanying drawings and detailed description and its scope will be pointed out in the appended claims.

BRIEF DESCRIPTION OF THE DRAWINGS

FIG. 4b shows a simplified view of the circumferential magnetic pathway through one stator ring for the alternate embodiment shown in FIG. 4a.

DETAILED DESCRIPTION OF THE PREFERRED EMBODIMENTS

Figure 1:
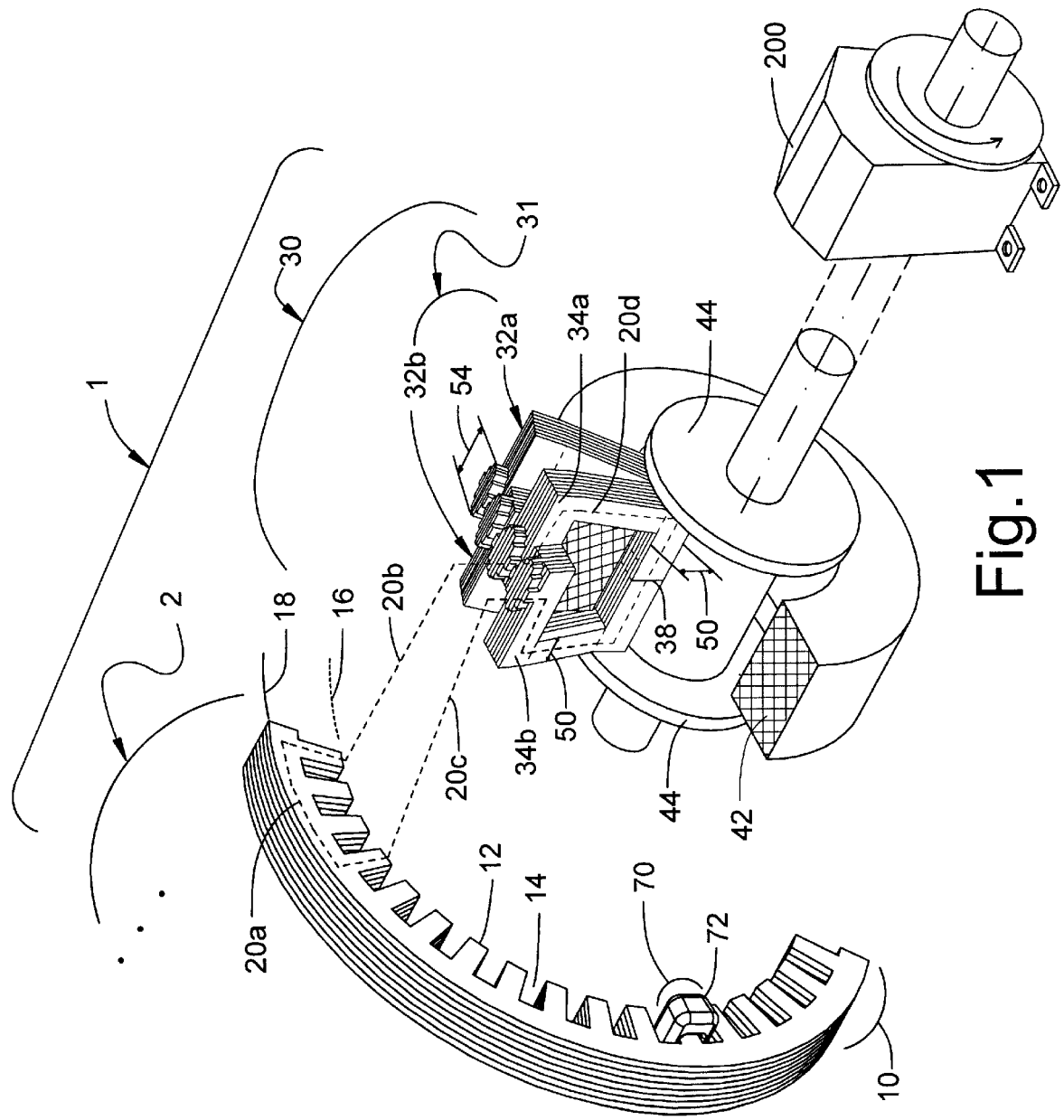
FIG. 1 shows a simplified view of the rotor and stator magnetic circuit.

Referring to FIG. 1, a low-loss magnetic core 1 of the present invention for a high-frequency alternator includes a stator 2 comprising one or more stator ring bundles 10 made entirely of laminated magnetic steel or electrical steel in order to reduce core losses. The stator ring bundles 10 have a plurality of teeth 12 and air slots 14 along the inner circumference 16 of the ring bundle 10. An outer circumference 18 of the ring bundle 10 is large enough to provide a circumferential magnetic pathway 20a within each laminate for magnetic flux to pass between the teeth 12 without saturation, as is well understood in the art. Armature poles 70 are formed by the combination of one or more stator teeth 12 and associated turns of wire 72, which form windings such as windings 101, 102, and 103 illustrated in FIG. 3a. Specifically, each armature pole 70 includes one or more turns of wire 72 around one or more stator teeth 12 arranged to produce an output voltage as the flux in the stator teeth 12 varies due to the rotation of individual rotor poles 32a, 32b, to be described herein, past the stator teeth 12.

The low-loss magnetic core 1 also includes a rotor 30 which includes a plurality of pairs of rotor poles 31 made entirely of laminated magnetic steel or electrical steel in order to reduce core losses. Each pair of rotor poles 31 is made by bending pairs of individual rotor laminate shapes 34a and 34b and bundling the laminate shapes 34a and 34b into groupings that become the rotor pole pairs 31. As shown in FIG. 1, the pairs of individual rotor laminate shapes 34a and 34b are bent to form an open three-dimensional shape similar to a square spiral of one and one quarter turns with an overlap along the edge near an air gap 53. The pairs of rotor poles 31 formed by bundling the adjacentpairs of rotor laminate shapes 34a and 34b develop this same three-dimensional open shape. The pair of bent rotor laminate shapes 34a and 34b are oriented approximately parallel with the centerline of a rotor shaft 36, as shown in FIG. 1, to provide a magnetic pathway 20d within the pair of laminate shapes 34a and 34b to complete the magnetic circuit of stator magnetic pathway 20a and air gap magnetic pathways 20b and 20c. The shaft 36 is couplable to a driving source of rotary mechanical power, such as a vehicle motor 200. The magnetic pathways 20a–20d are arranged to provide a complete magnetic circuit without reliance on adjacent laminates. The rotor laminate shapes 34a and 34b meet at a butt seam 38, the position of which is staggered from laminate to laminate in order to minimize the influence of the seam in a manner well understood in the art. While the rotor magnetic pathway 20d has been described as being comprised of a pair of rotor laminate shapes bent and butted together to form one and one quarter turns of a spiral, it should be understood that this magnetic pathway may be formed using more than two laminate sections efficiently butted together to make a single magnetic pathway following said spiral shape.

The bending of the rotor laminate shapes 34a and 34b and presence of the butt seam 38 allow the individual rotor poles 32a and 32b to overlap as the pairs of rotor poles 31. The individual overlapping rotor poles 32a and 32b will be of opposite magnetic polarity. Adjacent pairs of rotor poles 31 placed around the circumference of the rotor 30 create a pattern of overlapping rotor poles 32a, 32b of alternating polarity that interleave as suggested in FIG. 1 and FIG. 3b. This arrangement provides the alternating pole structure typical of claw pole rotors together with the magnetic pathways made entirely of laminated magnetic material as needed to minimize core losses.

All the pairs of rotor poles 31 are excited by one or more single-phase field coils 42 that are energized by some external source and are wound concentric to the shaft 36 and pass through the pairs of rotor poles 31 as shown in FIG. 1. The various pairs of rotor poles 31 are held in place and attached to the shaft 36 by any suitable mechanical means 44, such as a collar, that does not introduce core losses of its own in response to the excitation of the field coil 42. (The use of magnetic materials in providing said means 44 is generally unsuitable.)

Figure 2:
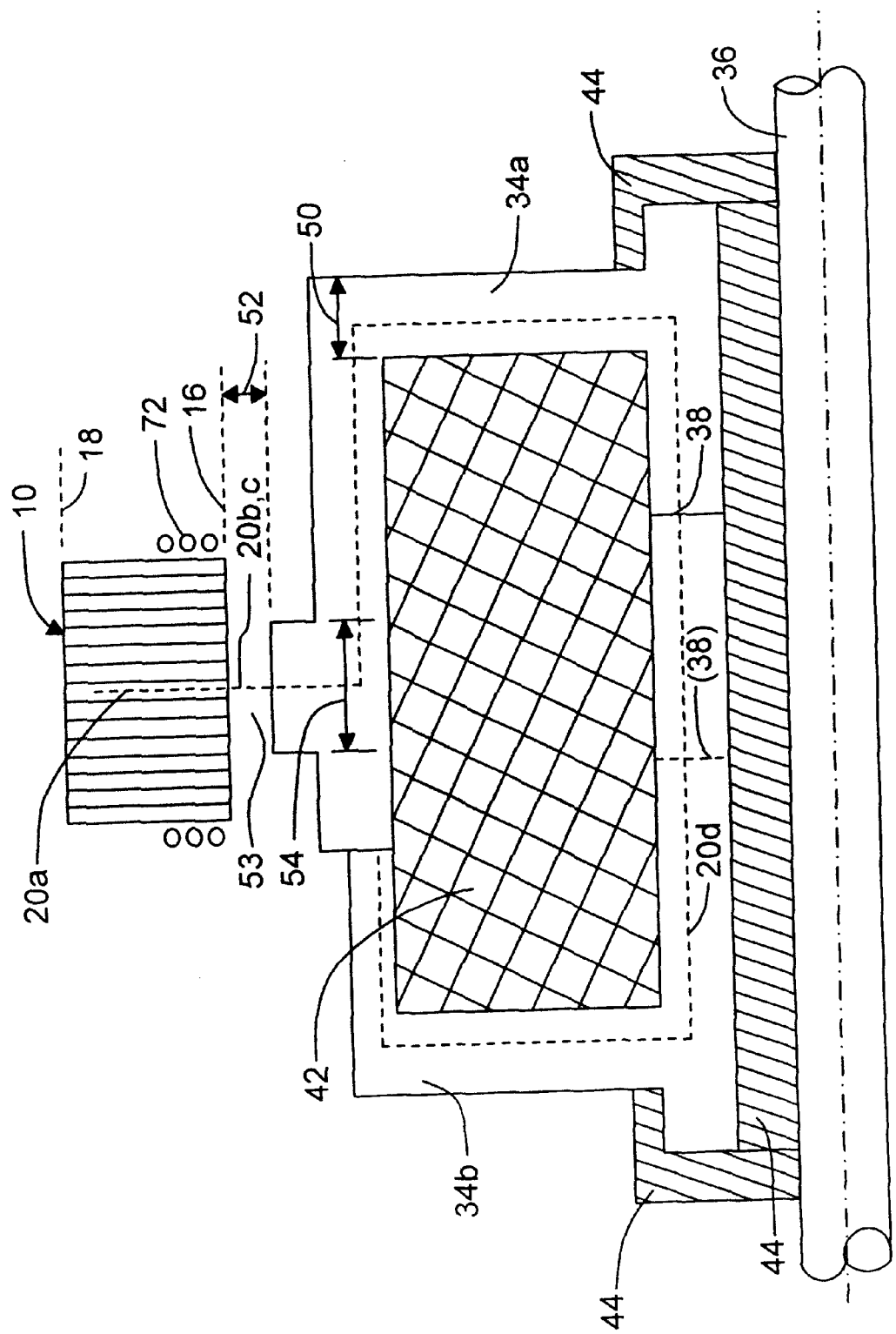
FIG. 2 shows a simplified view of the axial magnetic pathway through the rotor.

As shown in FIG. 2 each pair of rotor laminate shapes 34a and 34b is arranged to wrap around the field coil 42. Particularly for devices in which the field is to be modulated, the area allowed for the field coil 42 must be large enough to allow for a low resistance field coil circuit. Each rotor laminate shape 34a has a width 50 that must be sized to provide a flux pathway 20d as is well understood in the art. The amount of flux in each rotor laminate shape 34a is controlled by the level of field excitation and by the air gap dimensions of air gap length 52, air gap cross-section 54 and the laminate thickness. Smaller laminate thicknesses reduce eddy current losses but increase mechanical complexity in a manner well understood in the art. The individual air gap cross-sections 54 of rotor laminate shapes 34a and 34b are the same within each pair of said rotor laminate shapes. The air gap cross-section 54 of each adjacent rotor laminate shape is preferably different, as will be explained.

Figure 3A:
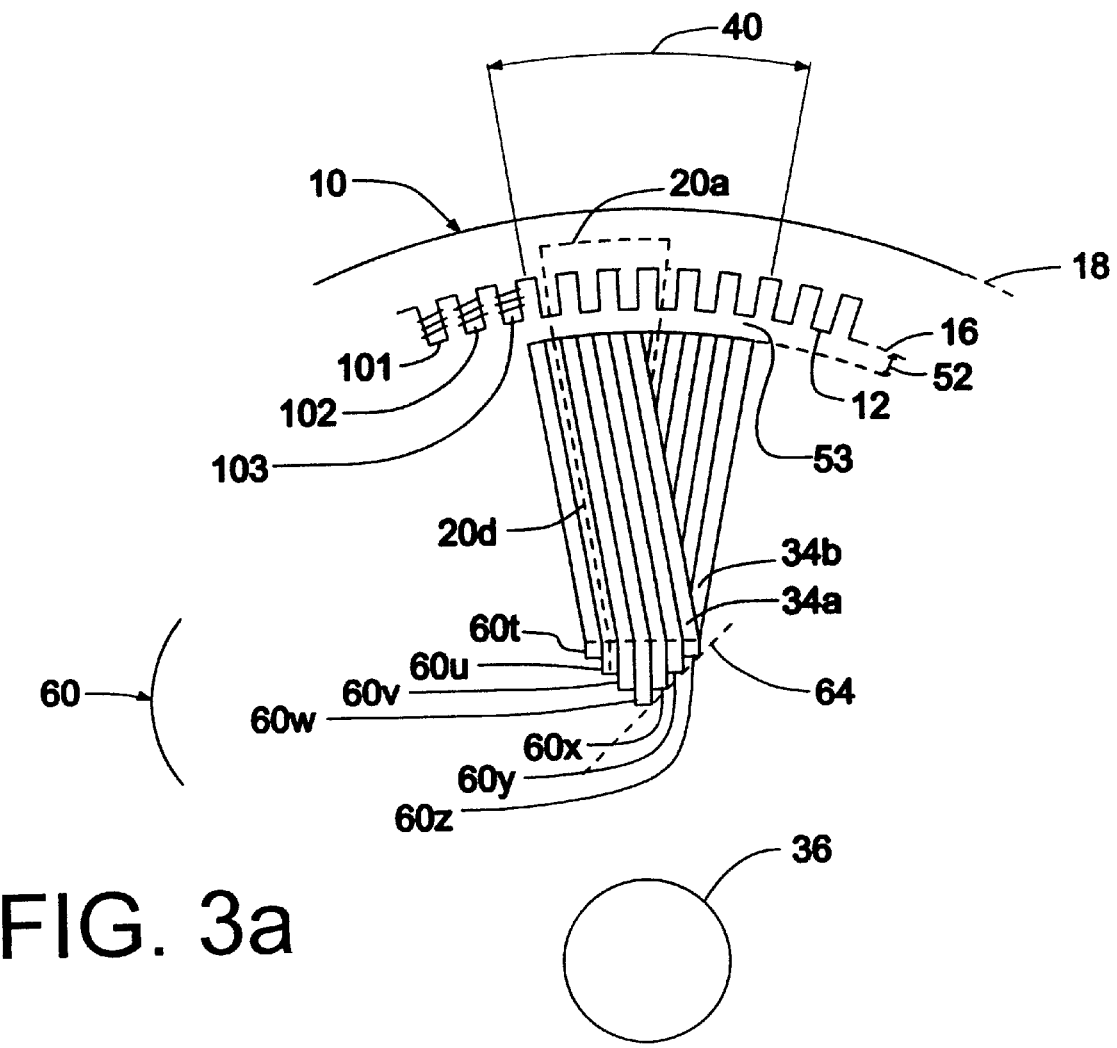
FIG. 3a shows a simplified view of the circumferential magnetic pathway through the stator.
Figure 3B:
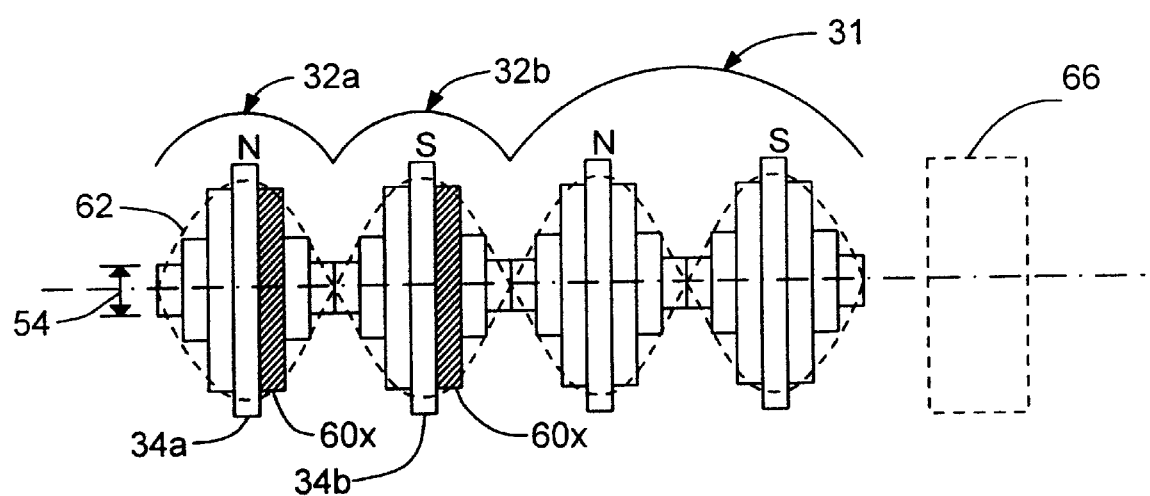
FIG. 3b shows a simplified "developed" cross section view perpendicular to the magnetic pathway along the circumference of the air gap looking toward the rotor.

As shown in FIG. 3a the bundling and bending of the pairs of rotor laminate shapes 34a and 34b into pairs of rotor poles 31 provides a bundle 60 of parallel but independent magnetic circuit pathways similar to the circuit completed by elements 20a–20d taken together. For convenience the elements of this set are labeled as 60t, 60u, 60v, 60w, 60x, 60y, 60z, although it should be understood that there may be more or less elements in the set. In order to provide for a sinusoidal flux variation with rotation, the air gap cross-section 54 of each rotor laminate shape is made to be different from the air gap cross-section of the adjacent rotor laminate shape and hence the flux level within each magnetic pathway 60t–60z is different from its neighbor. FIG. 3b shows one possible pattern 62 of variation of the air gap cross-sections 54 to produce a sinusoidal variation of flux as the pairs of rotor poles 31 pass under the stator teeth 12. It should be noted that the projected outline 66 of the stator teeth 12 at the air gap 53 is rectangular as shown. It is important that the pattern 62 of variation in the air gap cross sections be such that the two air gap cross sections 54 of each pair of rotor laminate shapes 34a and 34b are aligned axially so that the magnetic pathway 20a in the stator ring bundle 10 follows the circumferential plane of the stator ring laminates without crossing from laminate to laminate.

It will be understood that using the pattern 62 of variations in the air gap cross-sections will cause the flux levels in the outer laminates of the bundle 60, corresponding in this example to magnetic pathways 60t and 60z, to be less than the flux levels of the inner laminates, corresponding to magnetic pathways 60v, 60w and 60x. This allows the width 50 of the laminate shape 34a and 34b for the outer laminates to be considerably less than the width for the inner laminates. This difference in required width allows the inner portion of the pairs of rotor poles 31 to be tapered as shown by line 64. This taper 64 allows the adjacent pairs of the rotor poles 31 to nest radially around the circumference of the rotor 30. An integer number of pairs of rotor poles 31 are so nested.

In one embodiment of the present invention using a single stator ring bundle 10 the armature poles 70 may be arranged in the typical manner with each adjacent tooth 12 having the armature windings 101, 102, 103 of a separate phase of an output voltage. In this embodiment there would typically be six stator teeth 12 over the circumferential arc 40 encompassed by one pair of rotor poles 31 as shown in FIG. 3a. The armature poles 70 would typically be arranged to provide three separate phases of output voltage each displaced by 120 degrees of the cyclical alternation. In this embodiment, the pairs of rotor poles 31 would need to rotate by the arc 40 of six stator teeth 12 in order to complete a full alternation cycle in each phase of output voltage. The present invention may also be accomplished using other armature winding arrangements of similar effect.

Figure 4A:
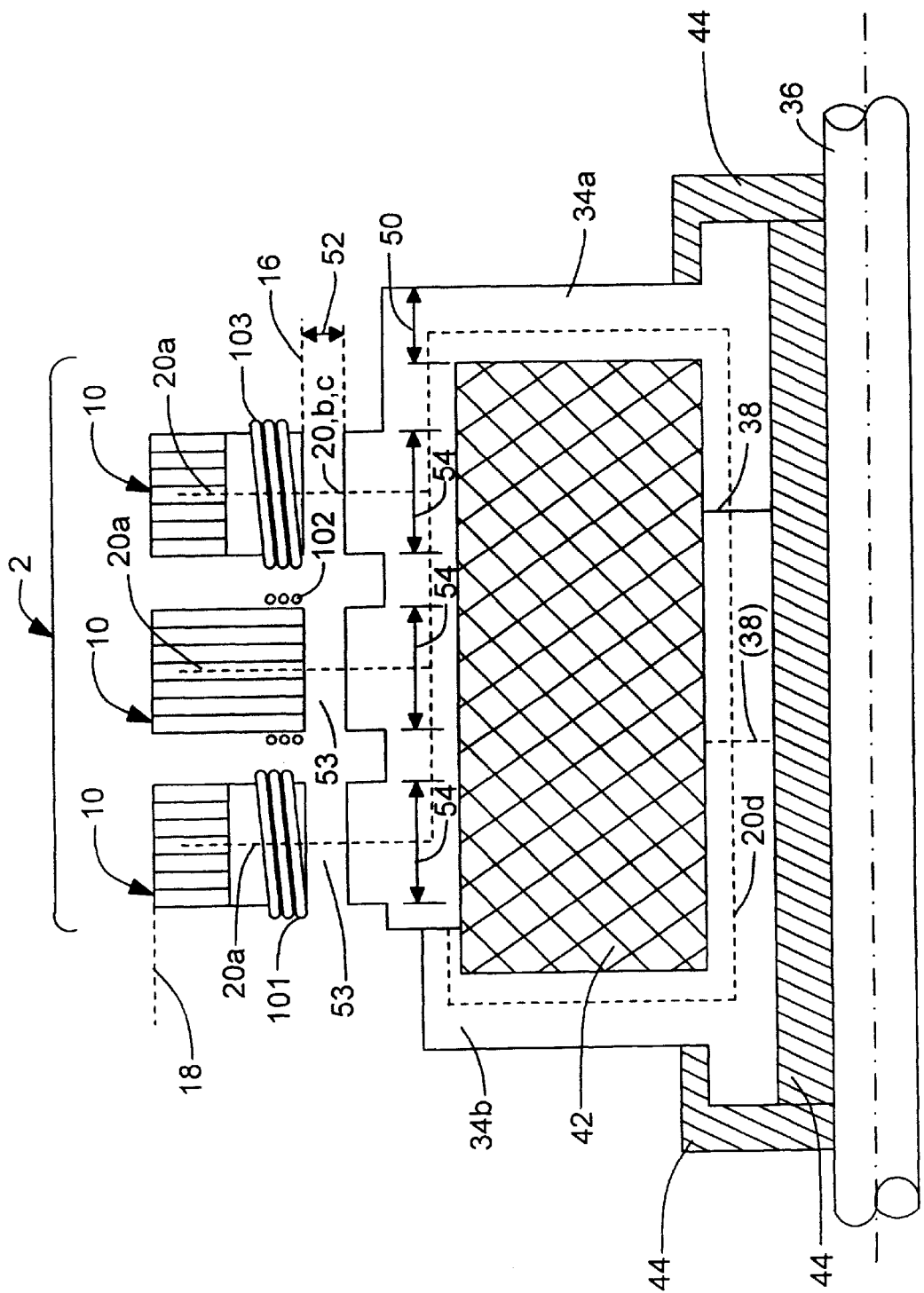
FIG. 4a shows a simplified axial view of an alternate embodiment of the rotor and multiple stator ring bundles with phase windings arranged for high frequency power production.
Figure 4B:
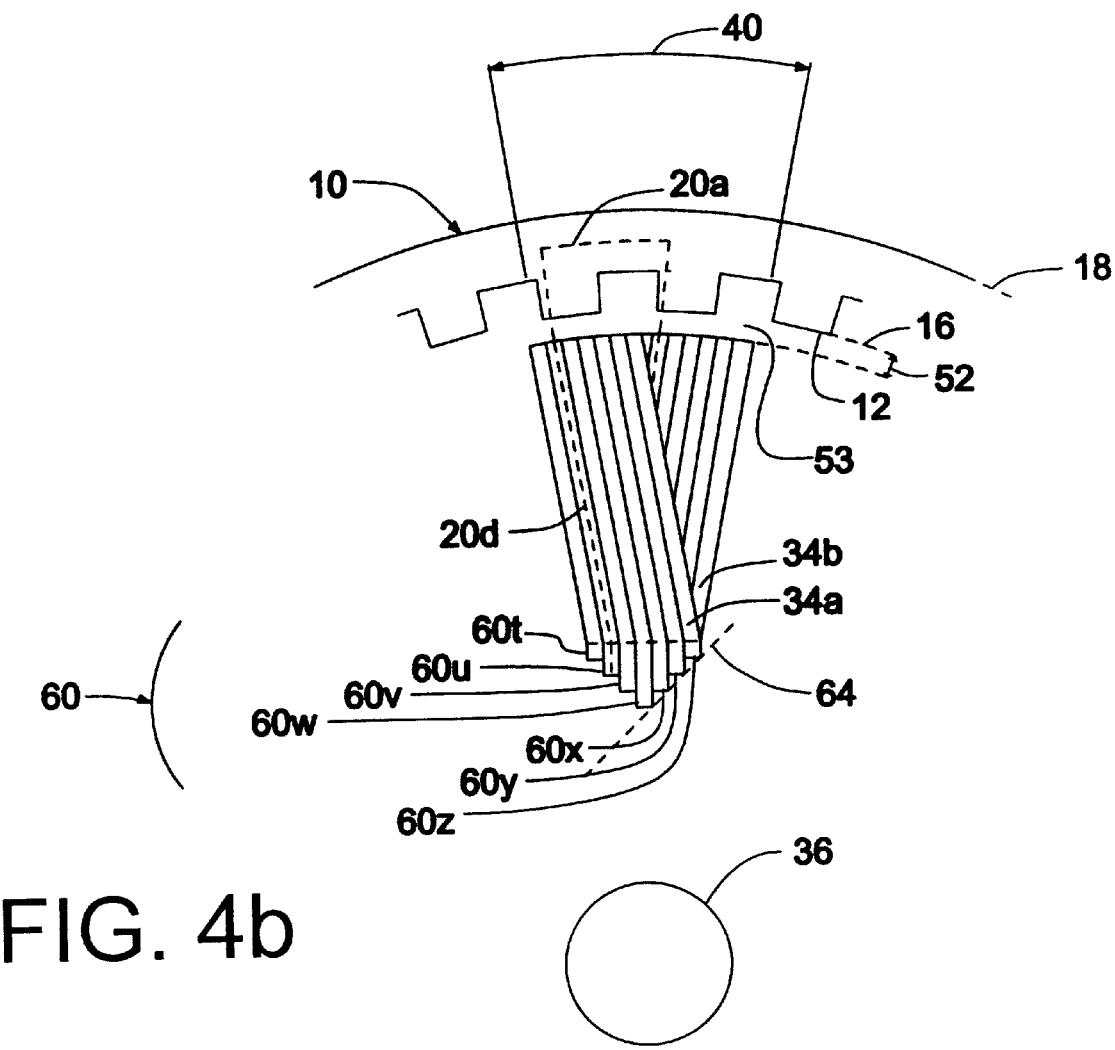

FIG. 4a shows an alternate embodiment for the present invention wherein the stator 2 includes a plurality of separate stator ring bundles 10 positioned in parallel at separate axial locations along the line of the shaft 36. There is a separate stator ring bundle 10 for each desired separate phase of output voltage. All armature poles 70 on a single stator ring bundle 10 have windings 101, 102 or 103 of a single phase of output voltage. In this embodiment each rotor laminate shape 34a has a separate air gap cross-section 54, each of the same dimension, for each separate stator ring bundle 10. In this embodiment the spacing of each pair of rotor poles 31 corresponds to the spacing of one pair of adjacent stator teeth 12 as shown in FIG. 4b. This arrangement will produce one complete alternation cycle each time the pair of rotor poles 31 rotates through the arc 40 of two adjacent stator teeth 12. Thus if the stator teeth 12 are at the same spacing in each embodiment the frequency of alternation will be three times higher for the same shaft speed than in the previous embodiment. This higher frequency allows less magnetic material, or fewer turns of wire 72, in the armature poles 70 to generate the needed output voltage. It should also be noted that, compared to the previous embodiment, a single stator ring bundle 10 has three times as many armature poles 70 dedicated to the production of a single phase of output voltage. This increased number of armature poles 70 also reduces the amount of magnetic material, or the number of turns of wire 72, in the armature poles 70 needed to generate the output voltage. The alignment of the stator teeth 12 for each different stator ring bundle 10 is shifted circumferentially with respect to the rotor position in order to produce the desired separate phases of output voltage. It should be noted that in this case, the rotor laminate shape width 50 must accommodate the sum of the flux from the multiple phases. It should be further noted that, due to the interplay of phases the total flux is less than the sum of the maximum flux for each phase. It should also be noted that due to the interplay of phases, the total flux is relatively constant with rotation, which leads to minimal core losses due to rotation anywhere the total flux is carried. The flux in the armature teeth 12 and the air gap cross sections 54 undergo rapid variation with rotation, causing both the generation of voltage and localized core losses. However, the core losses are minimized by the use of laminated magnetic materials in the construction of the magnetic pathways 20a and 20d for this design.

Although the invention has been described with respect to various preferred embodiments, it should be realized that this invention is capable of a wide variety of further and other equivalent embodiments deemed to be within the scope and spirit of invention as defined by the appended claims.

What is claimed is:

1. An apparatus for generating electrical power from the rotation of a shaft, said apparatus comprising:
   (a) a stator including a plurality of ring bundles made of a low-core-loss material with alternating internal stator teeth and air slots around a circumference of an inner edge of each of said ring bundles, wherein each of said ring bundles is formed of a plurality of stator laminates;
   (b) a plurality of armature poles created by winding armature coils around one or more of said stator teeth, wherein one or more phases of electrical output are created by the arrangement of said armature poles and the series and parallel electrical connections of said armature coils;
   (c) a rotor separated from said stator by a radial air gap, said rotor including a plurality of pairs of rotor poles wherein:
      (i) each pair of said rotor poles has magnetic pathways made entirely of a low-core-loss material;
      (ii) each pair of rotor poles is formed by a plurality of rotor laminates bent and bundled together and oriented so as to substantially reduce eddy currents due to flux flow between adjacent ones of said rotor laminates; and
      (iii) an integer number of adjacent pairs of said rotor poles are arranged to nest circumferentially around said rotor and to provide poles of alternating polarity around the circumference;
   (d) one or more field coils attached to said rotor and arranged to excite all of said rotor poles in common synchrony; and
   (e) a shaft to couple said rotor and said one or more field coils to a driving source of rotary mechanical power, wherein said magnetic pathways are established by arrangement of said rotor laminates such that a magnetic flux excited by said one or more field coils can be conducted to and from said stator, via said radial air gap, wherein each of said plurality of stator ring bundles has an armature pole for a single phase of output voltage, wherein each said rotor laminate has a separate air gap cross section for each of said one or more stator ring bundles, wherein each single pair of stator teeth is spaced circumferentially around a sector of air gap established by each pair of said rotor poles, wherein patterns of said air gap cross sections are aligned to rotate directly in line with said stator teeth, and wherein alignment of said stator teeth of each said stator ring bundle is shifted circumferentially with respect to said stator teeth of others of said stator ring bundles in order to establish a desired phase difference in the output voltage excited by said armature poles as said rotor rotates.

2. The apparatus as in claim 1
   wherein said rotor laminates are bent to form an open three-dimensional shape substantially as a square spiral of about one and one quarter turns with overlap along one edge of said three-dimensional shape, and with sufficient room in a central portion of said shape for windings of said one or more field coils to pass.

3. The apparatus as in claim 2 wherein said rotor laminates are designed to carry a magnetic flux excited by said one or more field coils and further include one or more air gap cross-section edges along the portion of each of said rotor laminates closest to said stator teeth, said air gap cross-section edges being sufficiently distinct from air gap cross-section edges of adjacent ones of each of said rotor laminates so that each of said edges provides control of the air gap dimension for purposes of establishing magnetic flux intensities therein.

4. The apparatus of claim 1 wherein said low-core-loss material of said stator and said rotor is formed of a laminated steel.

5. The apparatus of claim 4 wherein said laminated steel is selected from the group consisting of laminated electrical steel and laminated magnetic steel.

6. The apparatus as in claim 1 wherein each of said pairs of rotor poles is formed of a plurality of individual rotor laminates bent and bundled together and arranged to lie approximately parallel to a centerline of said shaft.

7. The apparatus as in claim 6 wherein each of said individual rotor laminates is formed of a plurality of individual laminate shapes butted together to form an open three-dimensional shape having a central portion and a plurality of edges, wherein said three-dimensional shape is configured substantially as a rectangular spiral of about one and one-quarter turns with overlapping portions along one edge of said open three-dimensional shape, said one edge being oriented parallel to the centerline of said shaft and, of said plurality of edges, farthest away from said shaft and adjacent to said radial air gap, and wherein said individual laminates include a bend formed therein to provide an opening between said overlapping portions, said opening having a dimension approximately equivalent of one pole spacing in a direction approximating the circumference of a circle centered on the centerline of said shaft, wherein said three-dimensional shape is designed to include within said central portion sufficient room for windings of said one or more field coils to pass therethrough.

8. An apparatus for generating electrical power from the rotation of a shaft, said apparatus comprising:
(a) a stator including a plurality of ring bundles made of a low-core-loss material with alternating internal stator teeth and air slots around a circumference of an inner edge of each of said ring bundles, wherein each of said ring bundles is formed of a plurality of stator laminates;
(b) a plurality of armature poles created by winding armature coils around one or more of said stator teeth, wherein one or more phases of electrical output are created by the arrangement of said armature poles and the series and parallel electrical connections of said armature coils;
(c) a rotor separated from said stator by a radial air gap, said rotor including a plurality of pairs of rotor poles wherein:
  (i) each pair of said rotor poles has magnetic pathways made entirely of a low-core-loss material;
  (ii) each pair of rotor poles is formed by a plurality of rotor laminates bent and bundled together and oriented so as to substantially reduce eddy currents due to flux flow between adjacent ones of said rotor laminates; and
  (iii) an integer number of adjacent pairs of said rotor poles are arranged to nest circumferentially around said rotor and to provide poles of alternating polarity around the circumference;
(d) one or more field coils attached to said rotor and arranged to excite all of said rotor poles in common synchrony; and
(e) a shaft to couple said rotor and said one or more field coils to a driving source of rotary mechanical power, wherein said magnetic pathways are established by arrangement of said rotor laminates such that a magnetic flux excited by said one or more field coils can be conducted to and from said stator, via said radial air gap, wherein individual ones of said rotor laminates are designed to form an open three-dimensional shape having a central portion and a plurality of edges, wherein said three-dimensional shape is configured substantially as a rectangular spiral of about one and one-quarter turns with overlapping portions along one edge of said open three-dimensional shape, said one edge being oriented parallel to the centerline of said shaft and, of said plurality of edges, farthest away from said shaft and adjacent to said radial air gap, and wherein said individual laminates include a bend formed therein to provide an opening between said overlapping portions, said opening having a dimension approximately equivalent of one pole spacing in a direction approximating the circumference of a circle centered on the centerline of said shaft, wherein said three-dimensional shape is designed to include within said central portion sufficient room for windings of said one or more field coils to pass therethrough.

9. The apparatus as in claim 8 wherein said plurality of rotor laminates are nested adjacent to one another in a direction approximating the circumference of a circle centered on the centerline of said shaft to create a rotor laminate bundle, wherein said rotor laminate bundle is designed to effect a pair of overlapping rotor poles, wherein individual laminates of said rotor laminate bundle have corresponding sequential positions within each of said overlapping rotor poles with respect to the circumference of said circle centered on said shaft centerline.

10. The apparatus as in claim 9 wherein a plurality of said rotor laminate bundles are nested evenly around a circumference of a circle centered on said shaft to form an integer number of pairs of overlapping rotor poles of alternating polarity when excited by said one or more field coils, wherein air-gap cross-sections of said overlapping rotor poles are arranged to provide sinusoidal variation of flux through said stator teeth as said rotor turns under said stator teeth, and wherein said air-gap cross-sections and said stator laminates are arranged to establish a complete magnetic pathway using said rotor laminates in series with said radial air gap and said stator laminates, and wherein said stator laminates are oriented so as to minimize eddy currents caused by said magnetic flux flowing between adjacent ones thereof.

11. An apparatus for generating electrical power from the rotation of a shaft, the apparatus comprising:
(a) a stator including one or more ring bundles made of a low-core-loss material with alternating internal teeth and air slots around a circumference of an inner edge of each of said ring bundles, wherein each of said bundles is formed of a plurality of stator laminates;
(b) a plurality of armature poles created by winding armature coils around one or more stator teeth, wherein one or more phases of electrical output are created by the arrangement of said armature poles and the series and parallel electrical connections of said armature coils;
(c) a rotor separated from said stator by a radial air gap, said rotor including a plurality of pairs of rotor poles wherein:

(i) each pair of said rotor poles has magnetic pathways made entirely of a low-core-loss material;

(ii) each pair of rotor poles is formed by a plurality of rotor laminates bent and bundled together; and (iii) an integer number of adjacent pairs of said rotor poles are arranged to nest circumferentially around said rotor and to provide poles of alternating polarity around the circumference;

(b) one or more field coils attached to said rotor and arranged to excite all of said rotor poles in common synchrony; and (c) a shaft to couple said rotor and said one or more field coils to a driving source of rotary mechanical power, wherein said rotor laminates are designed to form an open three-dimensional shape having a central portion and a plurality of edges, wherein said three-dimensional shape is configured substantially as a rectangular spiral of about one and one-quarter turns with overlapping portions along one edge of said open three-dimensional shape, said one edge being oriented parallel to the centerline of said shaft and, of said plurality of edges, farthest away from said shaft and adjacent to said radial air gap, and wherein said individual laminates include a bend formed therein to provide an opening between said overlapping portions, said opening having a dimension approximately equivalent of one pole spacing in a direction approximating the circumference of a circle centered on the centerline of said shaft, wherein said three-dimensional shape is designed to include within said central portion sufficient room for windings of said one or more field coils to pass therethrough.

12. An apparatus for generating electrical power from the rotation of a shaft, the apparatus comprising:

(a) a stator including one or more ring bundles made of a low-loss-core material with alternating internal stator teeth;

(b) a rotor separated from said stator by a radial air gap, said rotor including a plurality of pairs of rotor poles made of low-loss-core material, wherein each of said pairs of rotor poles is formed of a plurality of rotor laminates bent and bundled together and oriented so as to substantially reduce eddy currents due to flux flow between adjacent ones of said rotor laminates;

(c) one or more field coils attached to said rotor; and (d) means to couple said rotor and said one or more field coils to a driving source of rotary mechanical power, wherein each of said plurality of rotor laminates includes a plurality of individual laminate shapes oriented in a direction substantially parallel to the centerline of said shaft, wherein individual laminate shapes of each of said plurality of rotor laminates are butted together to form an open three-dimensional shape having a central portion and a plurality of edges, wherein said three-dimensional shape is configured substantially as a rectangular spiral of about one and one-quarter turns with overlapping portions along one edge of said open three-dimensional shape, said one edge being oriented parallel to the centerline of said shaft and, of said plurality of edges, farthest away from said shaft and adjacent to said radial air gap, and wherein said individual laminates include a bend formed therein to provide an opening between said overlapping portions, said opening having a dimension approximately equivalent of one pole spacing in a direction approximating the circumference of a circle centered on the centerline of said shaft, wherein said three-dimensional shape is designed to include within said central portion sufficient room for windings of said one or more field coils to pass therethrough.

13. The apparatus as in claim 12 wherein each of said rotor laminates includes two nearly symmetric individual rotor laminate shapes butted together at a butt joint positioned along a portion of said shape closest to said shaft, and wherein the position of said butt joint is staggered in adjacent pairs of said laminate shapes so that a staggered and overlapped seam is formed within a bundle of said plurality of rotor laminates.

14. The apparatus as in claim 12 wherein said plurality of rotor laminates are nested adjacent to one another in a direction approximating the circumference of a circle centered on the centerline of said shaft to create a rotor laminate bundle, wherein said rotor laminate bundle is designed to effect a pair of overlapping rotor poles, wherein individual members of said bundle have corresponding sequential positions within each of said overlapping rotor poles with respect to the circumference of said circle centered on said shaft centerline.

15. The apparatus as in claim 14 wherein a plurality of said rotor laminate bundle s are nested evenly around a circumference of a circle centered on said shaft to form an integer number of pairs of overlapping rotor poles of alternating polarity when excited by said one or more field coils, wherein air-gap cross-sections of said overlapping rotor poles are arranged to provide sinusoidal variation of flux through said stator teeth as said rotor turns under said stator teeth, and wherein said air-gap cross-sections and said stator laminates are arranged to establish a complete magnetic pathway using said rotor laminates in series with said radial air gap and said stator laminates, and wherein said stator laminates are oriented so as to minimize eddy currents caused by said magnetic flux flowing between adjacent ones thereof.

16. The apparatus as in claim 12 wherein said rotor laminates are designed to lie approximately in a plane parallel to and containing the centerline of said shaft so that flux flow is primarily radial and axial in relation to said shaft.

17. The apparatus as in claim 12 wherein said plurality of rotor laminates are designed such that adjacent ones thereof are of differing width so as to allow tapering and nesting of said adjacent ones to be coordinated with the circumferential variation in air gap cross sections of said pairs of rotor poles, and wherein said circumferential variation in said air gap cross sections is designed to create a desired flux waveform in said stator teeth as said rotor poles rotate past said stator.

18. The apparatus as in claim 17 wherein said circumferential variation in said air gap cross sections is designed to allow flux flow within individual ones of said stator laminates, and wherein said air gap cross sections and said stator laminates are arranged to establish a complete magnetic pathway using said rotor laminates in series with said radial air gap and said stator laminates, and wherein said stator laminates are oriented so as to minimize eddy currents caused by said magnetic flux flowing between adjacent ones thereof.

19. The apparatus as in claim 17 wherein said circumferential variation in said air gap cross sections is designed to establish the level of flux intensity within said rotor laminates so that said magnetic flux can complete a circuit through individual ones of said rotor laminates in a manner that substantially reduces eddy currents between adjacent ones of said laminates.

20. The apparatus as in claim 17 in which there is one stator ring bundle and wherein:

(a) there are one or more separate phases of output voltage created by circumferential positioning of said armature poles on said stator ring bundle and by electrical connections of said armature poles;

(b) there are at least two armature poles for each separate phase of output voltage spaced circumferentially over air gap cross-sections established by each of said pair of rotor poles; and (c) patterns of said air gap cross-sections are aligned to rotate directly in line with said stator teeth.

* * * * *